United States Patent [19]
Bolger

[11] Patent Number: 5,665,484
[45] Date of Patent: Sep. 9, 1997

[54] ELECTROLYTE CONDITIONING SYSTEM

[75] Inventor: John G. Bolger, Orinda, Calif.

[73] Assignee: Inductran Corporation, Orinda, Calif.

[21] Appl. No.: 529,363

[22] Filed: Sep. 18, 1995

[51] Int. Cl.[6] ................................................. H01M 2/40
[52] U.S. Cl. ................................... 429/62; 429/67; 429/81
[58] Field of Search ................................ 429/51, 62, 67, 429/71, 81

[56] References Cited

U.S. PATENT DOCUMENTS

| | | | |
|---|---|---|---|
| 3,083,253 | 3/1963 | Sundberg | 429/51 |
| 4,007,315 | 2/1977 | Brinkmann et al. | 429/62 |
| 4,221,847 | 9/1980 | Inkmann | 429/70 |
| 4,237,197 | 12/1980 | Hart | 429/81 |
| 4,283,467 | 8/1981 | Gütlich | 429/51 |
| 4,308,322 | 12/1981 | Hammar | 429/53 |
| 4,693,947 | 9/1987 | Weintraub et al. | 429/51 |
| 4,945,011 | 7/1990 | Tanaka | 429/81 |
| 5,032,476 | 7/1991 | Kirby | 429/81 |
| 5,096,787 | 3/1992 | Delaney et al. | 429/81 |
| 5,141,826 | 8/1992 | Böhm et al. | 429/120 |
| 5,252,412 | 10/1993 | Crepy et al. | 429/81 X |
| 5,356,735 | 10/1994 | Meadows et al. | 429/120 |
| 5,432,026 | 7/1995 | Sahm et al. | 429/120 |
| 5,443,926 | 8/1995 | Holland et al. | 429/120 |

*Primary Examiner*—Stephen Kalafut

[57] ABSTRACT

The invention consists of a method and apparatus for circulating electrolyte within individual cells of a liquid electrolyte battery while maintaining all cells at a uniform temperature. The invention is an improved method and apparatus for circulating the electrolyte within a cell by the introduction of an actuating fluid into a pump placed in the cell; the actuating fluid concurrently functions as a heat transfer medium through which the temperature of the electrolyte in each cell of the battery is controlled and homogenized. The current invention thus homogenizes both electrolyte concentration and electrolyte temperature throughout all cells of a battery.

20 Claims, 12 Drawing Sheets

ELECTROLYTE CONDITIONING SYSTEM

BACKGROUND OF THE INVENTION

1. Field of Invention

The present invention relates to a method and apparatus for concurrently circulating the electrolyte within each cell of a battery while maintaining the electrolyte in all cells at an optimum, uniform temperature.

2. Discussion of Prior Art

Liquid electrolyte lead acid batteries are capable of much better performance than they currently provide. There are three primary deficiencies in the performance of flooded electrolyte lead acid batteries: inadequate energy density, inadequate life, and excessive maintenance requirements.

One reason for the limited performance of liquid electrolyte lead acid batteries is that the concentration of the electrolyte stratifies in the cells during charge and discharge, which degrades the battery's performance. Another reason is that the battery's chemical processes are sensitive to temperature, which is usually left uncontrolled in lead acid batteries. In order to achieve a substantial increase in the performance of flooded electrolyte batteries and significantly reduce each of the three deficiencies in the performance of lead acid batteries, both electrolyte circulation and temperature control, i.e. electrolyte conditioning, must be provided.

Electrolyte circulation

It is well-known in the battery art that a battery can deliver significantly more energy when the specific gravity of its electrolyte is homogenized by circulation. The energy output of a lead acid battery is maximized when it is discharged very slowly; the energy provided by a battery at a 20 hour discharge rate is typically more than twice the energy that would be provided at a 1.5 hour discharge rate. However, the duty cycles of electric vehicles often cause the battery to be discharged at rates as fast as 1.5 or 2 hours. The performance degradation at higher discharge rates is attributed to depleted ion concentration near the reaction zones in the battery plates. The depletion results because the mobility of the ions in the electrolyte is not sufficient to keep pace with the electrical discharge. Electrolyte circulation eliminates the ion depletion near the reaction zones, thus allowing much more energy to be delivered at higher discharge rates.

Further, the cooler, more dense electrolyte tends to concentrate at the bottom of the cell, resulting in non-uniform electrical performance and corrosion of the plates. Electrolyte circulation thus causes the plates to be used in a more even manner, significantly improving electrical performance and extending the life of the battery.

A major inconvenience in using deep-cycle, flooded-electrolyte, lead-acid batteries is the effort that is required to periodically monitor and correct the level of electrolyte in the cells. Conventional battery chargers finish the charging cycle at voltages that are above the gassing limit in order to cause the evolution of gasses that will stir the electrolyte and homogenize electrolyte concentration. The gassing depletes the electrolyte, which then must be replenished. If the electrolyte is circulated within the cells without gassing the battery, the need to replenish the electrolyte is eliminated.

A long standing problem in electric vehicles is the difficulty of determining the state of charge of the battery with reasonable accuracy and reliability. The specific gravity of the electrolyte in a cell is a reliable measure of the state of charge only after any concentration gradients in the electrolyte have had time to dissipate and the electrolyte concentration is homogenized. The specific gravity of the electrolyte can also be homogenized by providing continuous electrolyte circulation during discharge/charge cycles, which allows reliable specific gravity measurements to be made at any time.

Previous methods used to homogenize the concentration of electrolyte have included introducing gas bubbles into the cells through various devices to induce vertical circulation. U.S. Pat. Nos. 4,283,467, 3,083,253 and 4,693,947 It is difficult to control the circulation in these methods and they can cause acid vapor to be transported from the cell, which is both a hazard and results in depletion of the electrolyte.

Another approach is to remove the electrolyte from the cells and return it to different points within each cell with small peristaltic pumps. U.S. Pat. Nos. 4,221,847, 4,237,197 and 5,252,412 This method requires the transportation of the electrolyte outside of the cell through a system of pumps and tubes which is vulnerable to accidental spillage of the electrolyte.

The third approach to electrolyte homogenization is to provide a hydrostatic pump by creating a chamber in each cell with an inlet slightly above the electrolyte level, and a small outlet at the bottom of the cell. As the vehicle accelerates, the electrolyte level rises at the chamber end of the cell, spilling the more depleted and thus lighter electrolyte from the top of the cell into the chamber. The electrolyte flows downward when the vehicle is no longer accelerating, mixing with the more concentrated electrolyte at the bottom of the cell. U.S. Pat: Nos. 5,032,476 and 5,096,787 These devices function only while the vehicle is operating and the circulation produced is largely uncontrolled.

All of the previous devices have significant disadvantages which have limited their effectiveness and commercial use. The current invention induces circulation with small fluid pressure actuated pumps in each cell. This eliminates the deficiencies in the above methods: the circulation is controlled; no vapor is created, the electrolyte is not transported out of the cell, and the pumping system operates during both charging and discharging. Further, none of the previous devices concurrently provides electrolyte circulation and temperature control, and no attempt is made to eliminate the temperature differential between cells.

Electrolyte temperature homogenization

It is also well known in the battery art that the life of lead acid batteries is adversely affected as temperature rises. This phenomenon is traceable to the exponentially increasing solubility of the active materials in the acid electrolyte as temperature rises. A widely accepted relationship between life and temperature is that the life of a lead acid battery is halved for each 15 degree F. rise in operating temperature above 80 degrees F. It is not unusual to see substantial increases in cell temperatures due to losses within the battery during discharge and/or charge, especially in cells that are in the interior of a battery pack where they have little convective cooling.

While battery life decreases as temperature rises, the rate at which energy can be absorbed or discharged by each cell increases as temperature rises. Thus maximum battery life is limited by the hottest cells, while the maximum discharge rate and the charge receptivity of a battery pack is limited by the coolest cells. Therefore, battery should be maintained at an optimum temperature which maximizes both battery life and energy density.

Previous methods to control and homogenize the temperature of the electrolyte include placing cooling elements in the electrolyte above the plates with cooling medium circulated through them, which modifies the temperature in each cell and can be used to homogenize the temperature between cells. U.S. Pat. Nos. 5,432,026 and 4,007,315 There are also many examples of novel designs of the battery housing, to allow the flow of a cooling medium between and/or around the cells. These methods have various disadvantages, including the electrical hazards associated with the use of metal cooling elements and the requirement of specially designed housings. None of the methods provide for concurrent electrolyte circulation.

The cell pumps in the current invention serve not only to circulate the electrolyte but also to transfer heat between the electrolyte and the fluid that is used to actuate the pumps. This method substantially reduces the complexity and cost of cooling the cells.

OBJECTS AND ADVANTAGES

Accordingly, the primary object and advantage of the present invention is to provide a means by which liquid electrolyte can concurrently be circulated within each cell of a battery while the temperature of the liquid electrolyte in all cells is maintained within the optimum operating range. No previous art has, to our knowledge, had as its primary object to concurrently circulate the electrolyte while controlling the temperature thereof. Further objects and advantages include achieving the primary object controllably without transportation of the hazardous electrolyte outside of the cell, with minimal structural modification to the cell or battery housing, and with minimal support apparatus outside of the battery. The components of the invention are inexpensive to manufacture and simple to use, and can be supplied either at the time of manufacture of the battery or can be retrofitted, and can be used for cells of various sizes with minimal modification. Still further objects and advantages of the invention will become apparent from a consideration of the drawings and ensuing description of it.

DESCRIPTION OF INVENTION

LIST OF REFERENCE NUMERALS

| | List of Reference Numerals: |
|---|---|
| 2 | Plates |
| 3 | Hydraulic power supply |
| 5 | Cell pump |
| 6 | Flange |
| 7 | Gasket |
| 12 | Cell pump body |
| 14 | Fitting |
| 15 | Suction tube |
| 16 | Disk valve |
| 17 | Discharge tube |
| 18 | Enclosure |
| 19 | Head of cell pump |
| 23 | Bladder |
| 24 | O ring |
| 25 | Inner compartment |
| 26 | Outer compartment |
| 27 | Disk valve retainer |
| 28 | Retainer screw |
| 29 | Suction cavity |
| 30 | Discharge cavity |
| 32 | Motor of pressure pump |
| 33 | Pressure pump |
| 34 | Motor of suction pump |
| 35 | Suction pump |
| 36 | Main conduit |
| 37 | Manifold block |
| 38 | Supply/return tubes |
| 39 | Blades |
| 42 | Reservoir |
| 43 | Passage |
| 46 | Fan |
| 47 | Fins |
| 48 | Electric heater |
| 49 | Fan motor |
| 50 | Battery pack |
| 52 | Inductive current sensor |
| 53 | Electronic controller |
| 54 | Thermal switch for fan |
| 55 | Thermal switch for heater |
| 56 | Voltage regulator |
| 57 | Solid state switch for thermal switches |
| 58 | Timer |
| 59 | Flip flop circuit |
| 60 | Solid state switch for pressure pump |
| 61 | Solid state switch for suction pump |
| 62 | Battery cables |
| 71 | Cell pump |
| 72 | Cell pump body |
| 73 | Bladder |
| 74 | O ring |
| 75 | Fitting |
| 76 | Head |
| 77 | Inner compartment |
| 78 | Outer compartment |
| 79 | Suction valve |
| 81 | Passage |
| 82 | Passage |
| 83 | Passage |
| 84 | Discharge valve |
| 85 | Discharge tube |
| 91 | Actuating Fluid |
| 92 | Electrolyte |
| 101 | Cell pump |
| 102 | Bladder |
| 103 | Supply/return tube |
| 104 | Jacket |

-continued

List of Reference Numerals:

| | |
|---|---|
| 105 | Manifold |
| 106 | Tubular vertical passages |
| 107 | Opening |
| 108 | Compartment |
| 109 | Suction |
| 110 | Flange |
| 111 | Gasket |
| 113 | Discharge valve |
| 119 | Hydraulic power supply |
| 120 | Gearhead motor |
| 121 | Crank arm |
| 122 | Connecting rod |
| 123 | Reservoir |
| 124 | Piston |
| 125 | Relief valves |

Description of the Invention

Cell Pump

Figure 1:
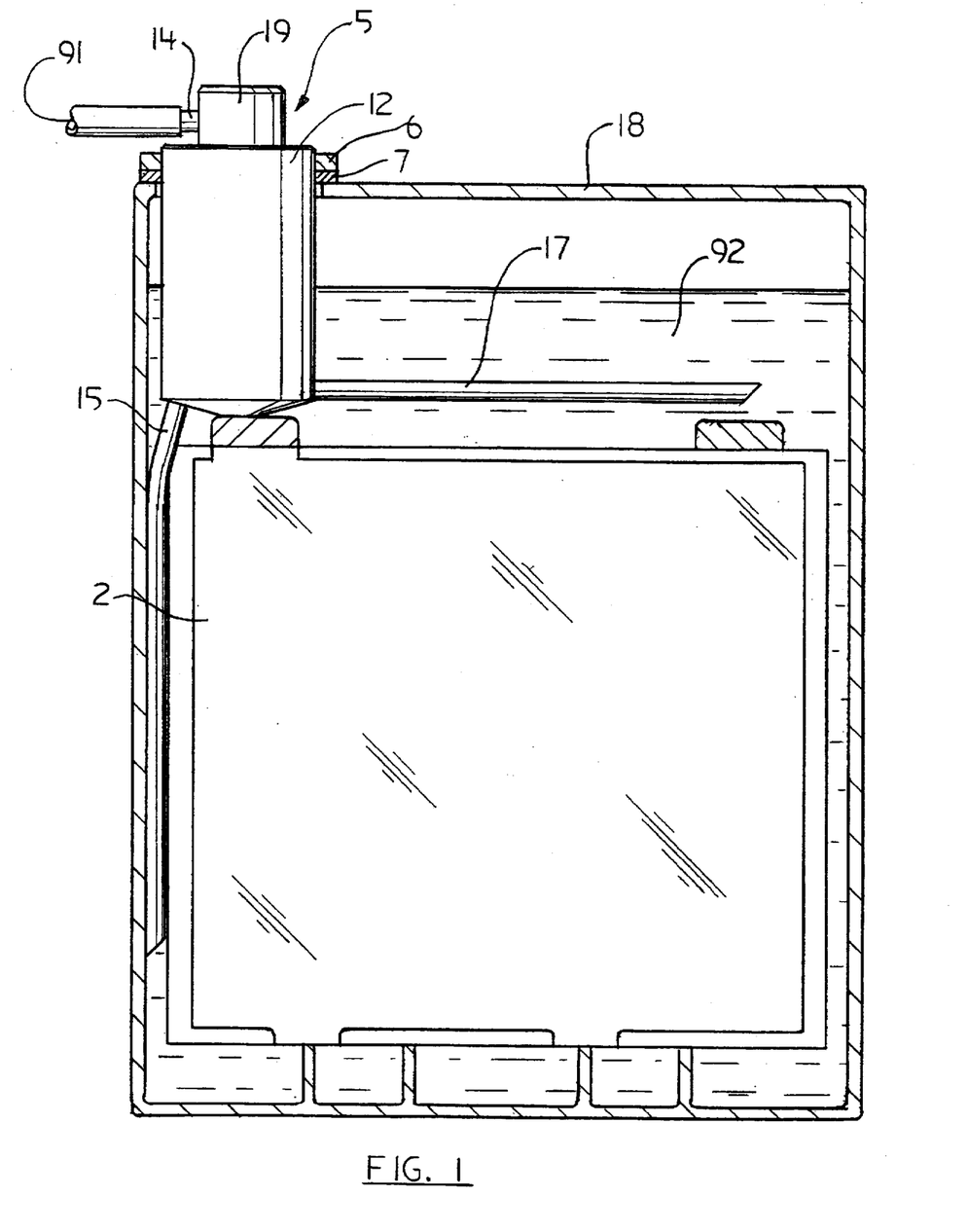
FIG. 1 is an elevation section of a cell with a cell pump installed in it according to the invention.

As shown in FIG. 1, a cell pump 5 is arranged above the plates 2 of the cell within enclosure 18 of the cell so that the pump 5 is permanently affixed in a partially submerged position in the electrolyte 92 in the cell by flange 6 and gasket 7. Actuating fluid 91 is supplied to and removed from the cell pump 5 through a fitting 14 extending from the head 19 of the cell pump 5. The cell pump 5 can be installed in the cell through a hole bored in enclosure 18 after the cell has been manufactured.

Figure 2:
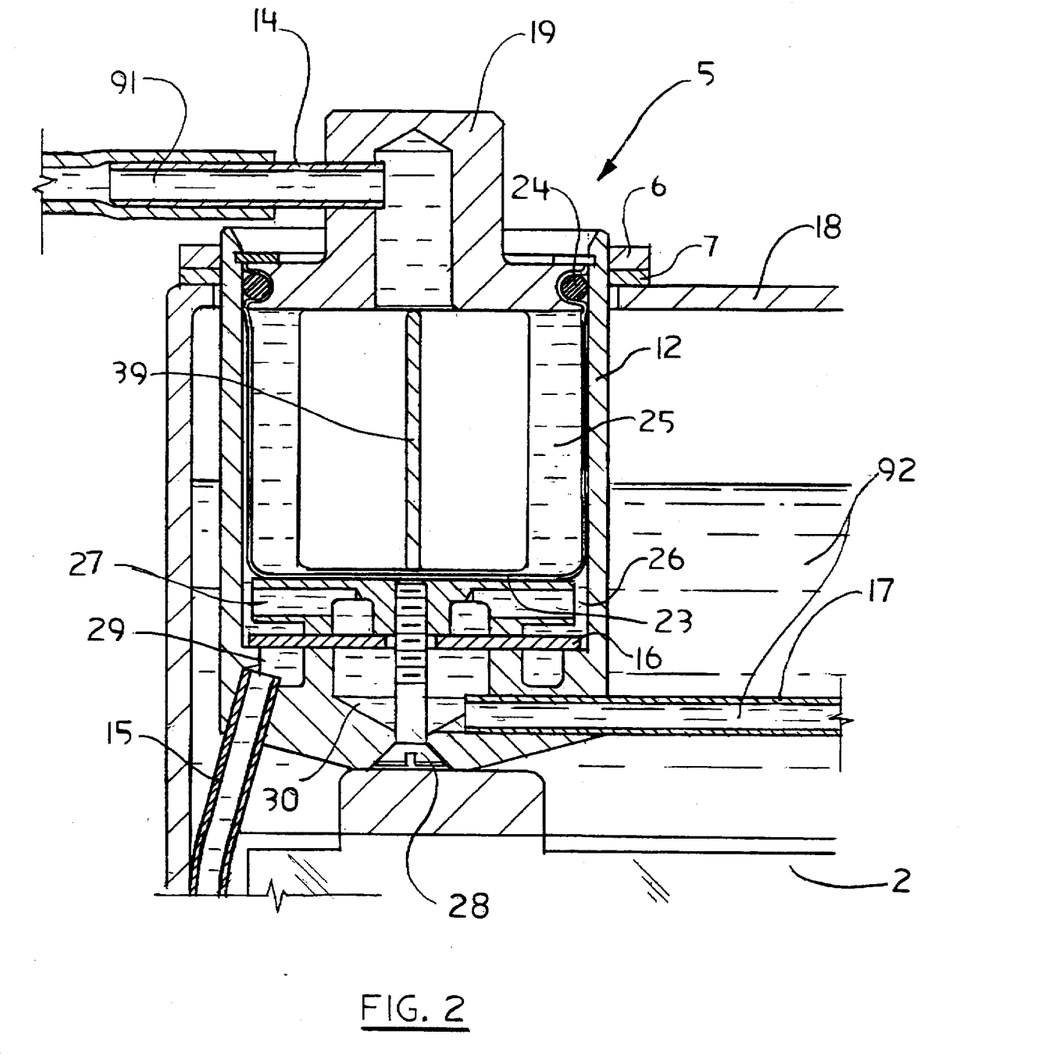
FIG. 2 is an enlarged vertical section through a cell pump.

As shown in FIG. 2, the interior volume of the cell pump is divided into two compartments 25 and 26 by a flexible bladder 23 which is sealed at its upper end against leakage along its inner and outer surfaces by 0 ring 24. The bladder 23 is constructed of a thin membrane of either acid resistant rubber or thin acid resistant plastic. The inner compartment 25 is filled with actuating fluid 91 and the outer compartment 26 is filled with electrolyte 92. A set of blades 39 are located inside bladder 23 to provide structure for the bladder to collapse against when the actuating fluid 91 is evacuated from the innder compartment 25. The discharge from outer compartment 26 is routed to the electrolyte 92 above the plates 2 through discharge tube 17 and through the inner portion of disk valve 16, and the inlet to compartment 26 is routed from the electrolyte 92 at the bottom of the cell through suction tube 15 and through the outer portion of disk valve 16. Disk valve 16 is constructed of acid resistant rubber. The disk valve 16 is held in place by retainer 27 and retainer screw 28 so that the outer portion of disk valve 16 covers suction cavity 29 and its inner portion covers discharge cavity 30 in the cell pump body 12.

Figure 5:
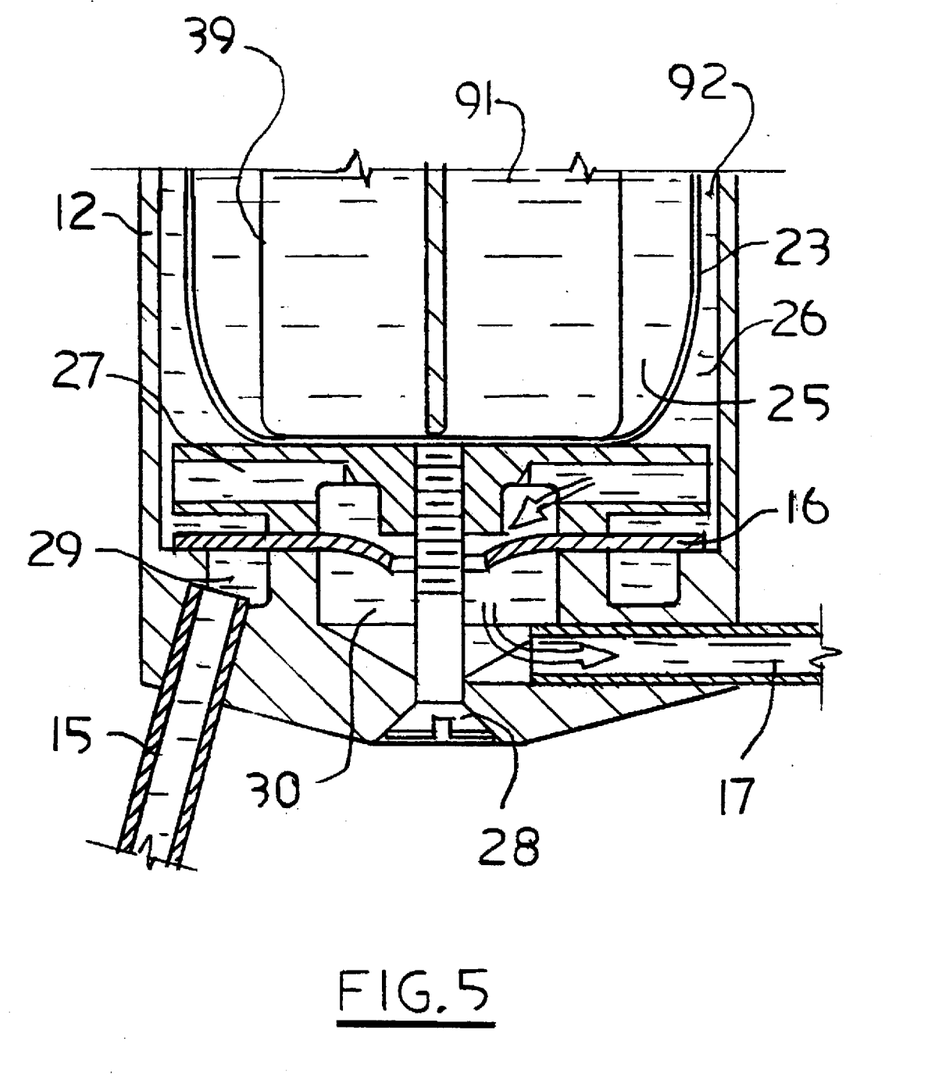
FIG. 5 is a partial section through the disk valve in the cell pump illustrating the operation of the valve during discharge portion of the operating cycle.
Figure 6:
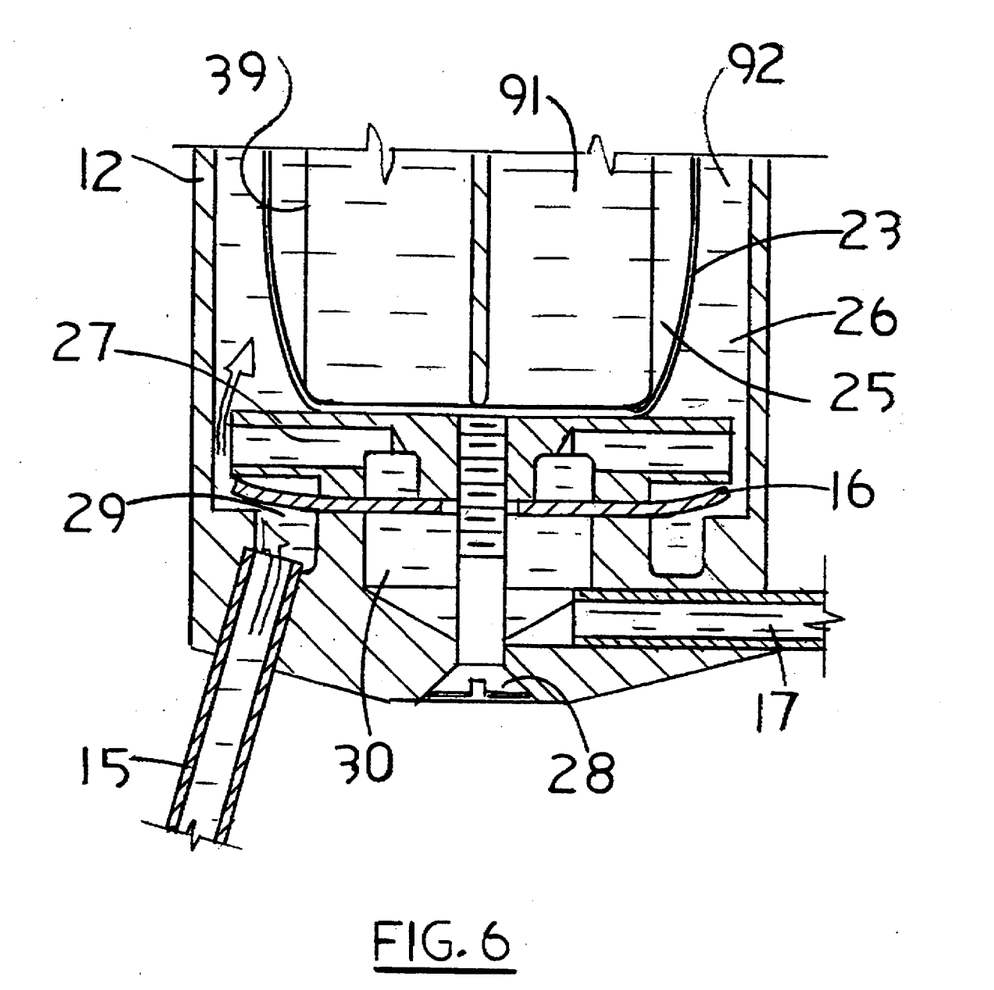
FIG. 6 is a partial section through the disk valve in the cell pump illustrating the operation of the valve during the suction portion of the operating cycle.

As shown in FIG. 5, when compartment 25 within bladder 23 is expanding as it is being filled with actuating fluid 91 by the pressure pump 33 in the hydraulic power supply 3, electrolyte 92 is displaced from outer compartment 26 through the inner portion of disk valve 16 into the discharge cavity 30. As shown in FIG. 6 when inner compartment 25 is contracting as it is being evacuated of actuating fluid 91 by the suction pump 35 in the hydraulic power supply 3, electrolyte 92 is drawn into the outer compartment 26 through the outer portion of disk valve 16 from suction cavity 29.

Figure 3A:
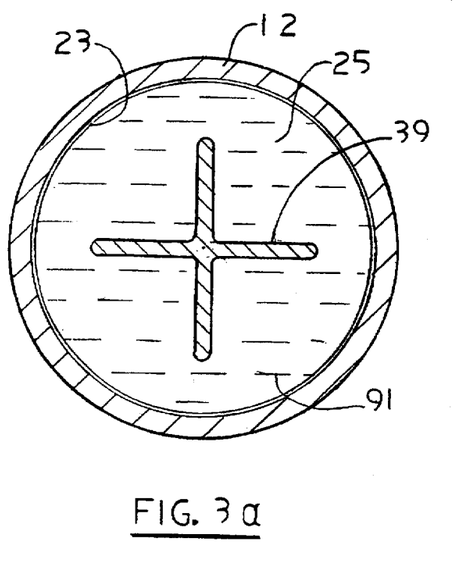
FIG. 3a is a horizontal section through the cell pump with negative actuating pressure.
Figure 3B:
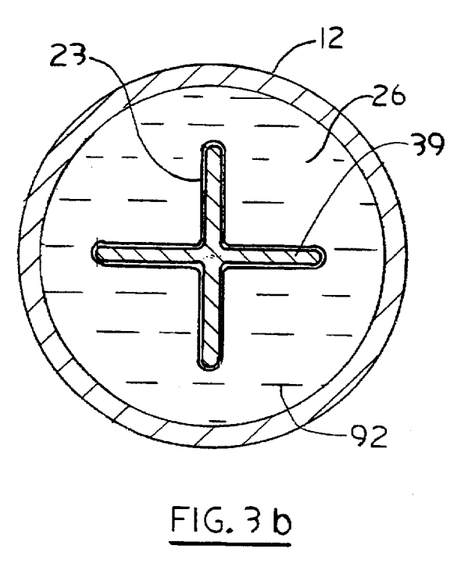
FIG. 3b is a horizontal section through the cell pump with positive actuating pressure.

As shown in FIG. 3a, when the actuating fluid 91 from the pressure pump 33 in the hydraulic power supply 3 completely fills compartment 25, the bladder 23 is expanded until it contacts the inside diameter of the cell pump body 12. As shown in FIG. 3b, when the actuating fluid 91 is nearly completely evacuated from compartment 25 by the suction pump 35 in the hydraulic power supply 3, the bladder 23 is contracted. The displacement of the cell pump 5 in each pumping cycle is the difference in the volume of compartment 26 with the bladder in these two positions. The peripheral length of the bladder 23 in the positions shown in FIGS. 3a and 3b are nearly equal so that very little stretching or contraction is required of the bladder 23 during pumping cycles.

As has been described, the cell pump 5 ingests electrolyte 92 through suction tube 15 from near the bottom of the plates 2 and discharges it through discharge tube 17 above the plates, which tends to mix and homogenize the concentration of the electrolyte 92 throughout the cell. The homogenization process is equally effective if the electrolyte 92 is ingested from the top of the cells through tube 17 and discharged near the bottom of the plates through tube 15, which requires only that the suction and discharge functions of disk valve 16 be reversed.

Because of its thinness and substantial surface area, the bladder 23 is a low impedance path for the flow of heat from the actuating fluid 91 to the electrolyte 92 through the bladder 23. Both the electrolyte 92 outside of the bladder 23 and the actuating fluid 91 inside the bladder 23 flow along the surfaces of the bladder 23 as it contracts and expands as the cell pump 5 operates. This motion of the actuating fluid 91 enhances the transfer of heat into or out of the surfaces of the bladder 23. This ability to effectively transfer heat ensures that only a minimal temperature difference can exist between the actuating fluid 91 and the electrolyte 92 while the cell pump 5 is operating. In this way the temperatures of the cells of a battery are homogenized at close to the temperature of the actuating fluid 91 by the operation of the cell pumps 5. The temperature of the battery can thus be maintained at a temperature that is optimum with respect to the performance of the battery and/or its life by controlling the temperature of the actuating fluid 91.

Hydraulic Power Supply

Figure 4:
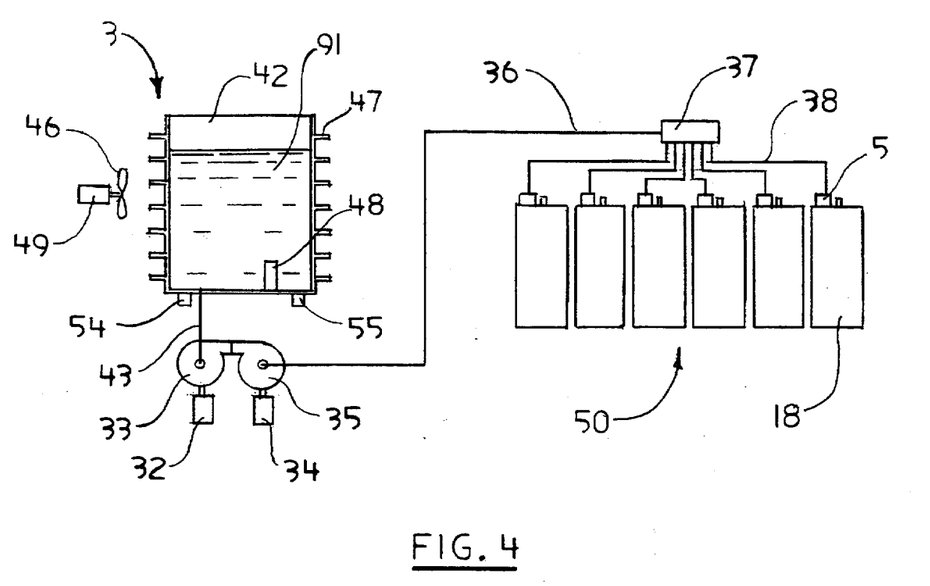
FIG. 4 is a schematic diagram of the hydraulic power supply according to the invention.

As shown in FIG. 4, the hydraulic schematic of the hydraulic power supply 3, actuating fluid 91 is stored in a reservoir 42 that is connected to the inlet of pressure pump 33 by passage 43. When the motor 32 of pressure pump 33 is operating, fluid pressure is applied to inner compartments 25 of the cell pumps 5 in each cell of battery pack 50 through inactive centrifugal suction pump 35, main conduit 36 to the manifold block 37, and through the supply/return tubes 38 and fittings 14. Alternatively, when motor 34 of the suction pump 35 is operating and motor 32 of the pressure pump 33 is not, negative pressure is developed in the main conduit 36, manifold block 37, supply/return tubes 38, and inner compartment 25 of the cell pumps 5, and actuating fluid 91 is pumped from inner compartments 25 of the cell pumps 5 to the reservoir 42 through inactive pressure pump 33 and passage 43.

The volume of the connecting fluid conduits 43, 36, and 38, and manifold 37 is recycled into the cell pumps 5 in each operating cycle without passing through the reservoir 42 where the temperature of the actuating fluid 91 is controlled, and thus cannot contribute to the heat transfer between the cell pumps 5 and the reservoir 42. Thus, the diameter and length of fluid conduits 43, 36, and 38, and manifold 37 are kept to the minimum that is required to keep frictional pressure losses within the capabilities of pumps 33 and 35. This recycled volume is typically designed to be from 15 to 30 percent of the displacement of the cell pumps 5, which is a small enough fraction that it does not seriously compromise the heat transfer capability of the electrolyte conditioning system.

A fan 46 driven by fan motor 49 is provided in the hydraulic power supply 3 to convectively cool the reservoir 42 for the actuating fluid 91 when required, as sensed by a thermal switch 54 that is mounted to the reservoir. The exterior surface area of the reservoir 42 is increased with fins 47 to enhance convective heat transfer to ambient air. An electric heater 48 is also provided in the reservoir to warm the actuating fluid 91 if its temperature is below the optimum operating range of the battery as sensed by thermal switch 55 that is mounted to the reservoir 42.

The hydraulic power supply 3 for the electrolyte conditioning system is activated whenever the battery 50 is being discharged or charged in order to enhance its performance and to maintain the battery 50 in an optimum operating temperature range. As shown in electrical block diagram FIG. 7, voltage from the battery 50 is supplied to a voltage regulator 56 which reduces the voltage to suit the solid state components in the electronic controller 53. An inductive current sensor 52 is installed on one of the battery cables 62 that provides a digital signal to the solid state switch 57 in electronic controller 53 for the hydraulic power supply 3 whenever current passes through the battery cable 62 in either direction. The switch 57 conducts power continuously to the thermal switches 54 and 55, and to either the motor 32 of the pressure pump 33 or to the motor 34 of the suction pump 35 as determined by flip flop circuit 59 for a period whose duration is regulated by timer 58.

Figure 7:
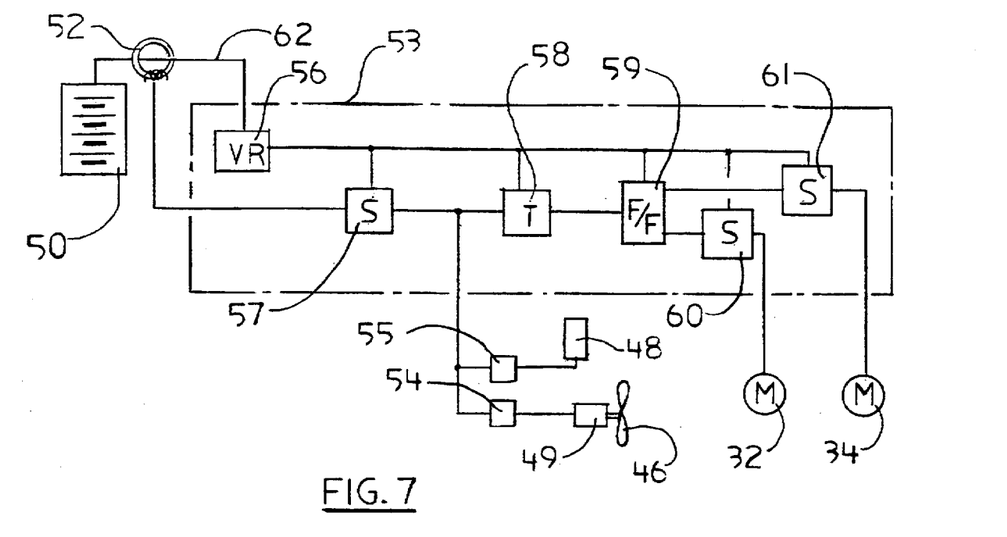
FIG. 7 is an electrical block diagram showing the electrical and electronic functions that are provided in the electrical controller for the hydraulic power supply.

After the timed period expires, the flip-flop circuit 59 reverses its output and activates either switch 60 or 61, which control the pressure pump 33 and suction pump 35 respectively, whichever switch was previously inactive, and deactivates the switch that had been active. The hydraulic power supply electronic controller 53 thus interrupts power to the activated pump motor and provides power to the other, previously inactive pump motor for a similar timed period. The timed period is electronically adjustable so that it can be adjusted to be sufficiently long to completely fill or to completely empty the compartment 25 in the cell pumps 5, depending on whether the pressure pump 33 or the suction pump 35 is operating at the time.

If the temperature of the reservoir 42 is sufficiently high to cause the thermal switch 54 to close, the motor 49 for the fan 46 is activated, and the reservoir 42 is convectively cooled. If the temperature is below the set point of the thermal switch 55, the electric heater 48 is activated and the reservoir's temperature is raised. The temperature of the reservoir 42 has been found to closely track the temperature of the cells while the hydraulic power supply 3 is active, so that the thermal switches 54 and 55 are able to reliably control the reservoir temperature within the range between their temperature settings, and it is unnecessary to sense the temperature at the battery for this purpose.

Alternate Embodiments

Figure 8:
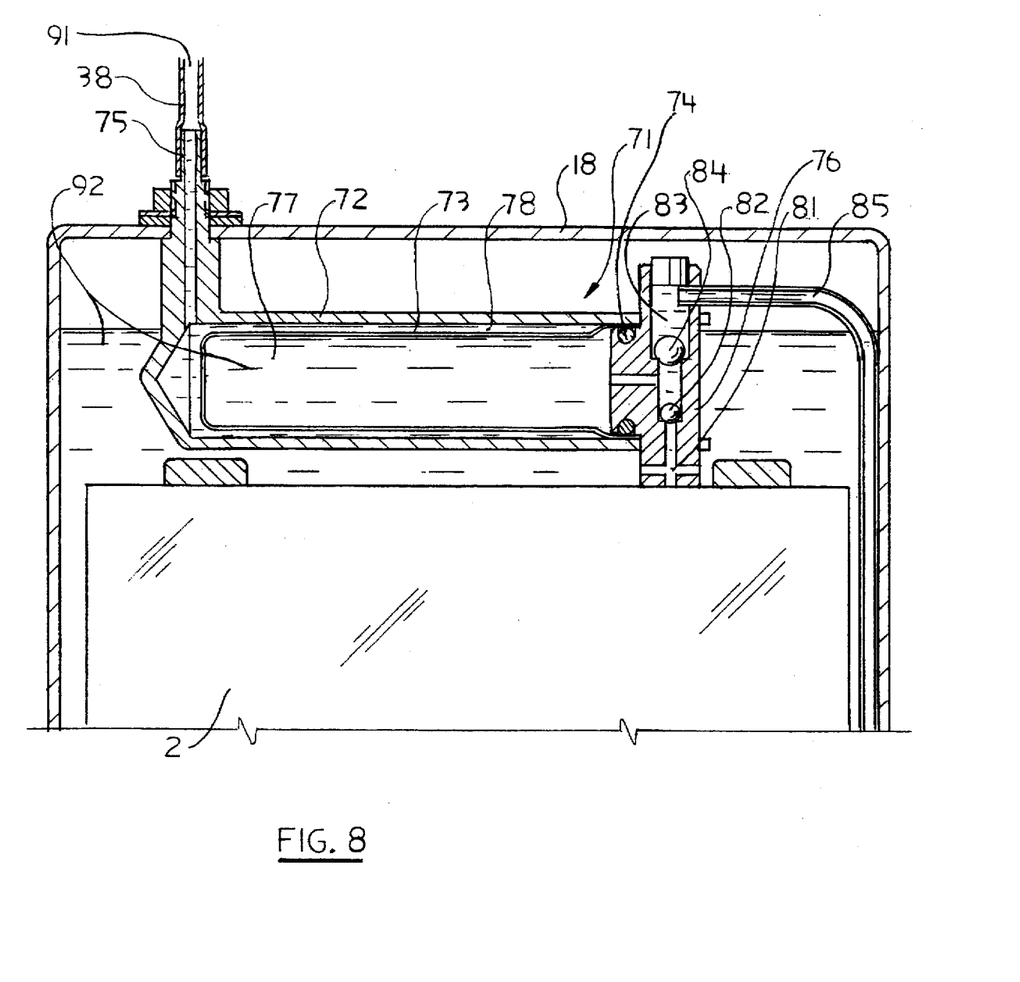
FIG. 8 is vertical cross section through the axis of a cell pump in a second embodiment of the invention.

In FIG. 8, the cell pump 71 is installed in the cell at the time of manufacturing and assembling the cell. A flexible bladder 73 is enclosed by body 72 of cell pump 71 and is sealed to head 76 of the cell pump 71 by 0 ring 74. Bladder 73 separates the internal volume of body 72 of cell pump 71 into an inner compartment 77 and an outer compartment 78. When actuating fluid 91 is supplied to outer compartment 78 by pressure pump 33 in hydraulic power supply 3 through supply/return tube 38 and fitting 75, bladder 73 is compressed and the electrolyte within compartment 77 is expelled at the bottom of the cell through discharge tube 85, passages 82 and 83, and discharge valve 84. When actuating fluid is evacuated from outer compartment 78 by suction pump 35 in hydraulic power supply 3, bladder 73 is expanded and electrolyte 92 is drawn into compartment 77 through suction valve 79, and passages 81 and 82 from the top of the plate assembly 2.

Figure 9:
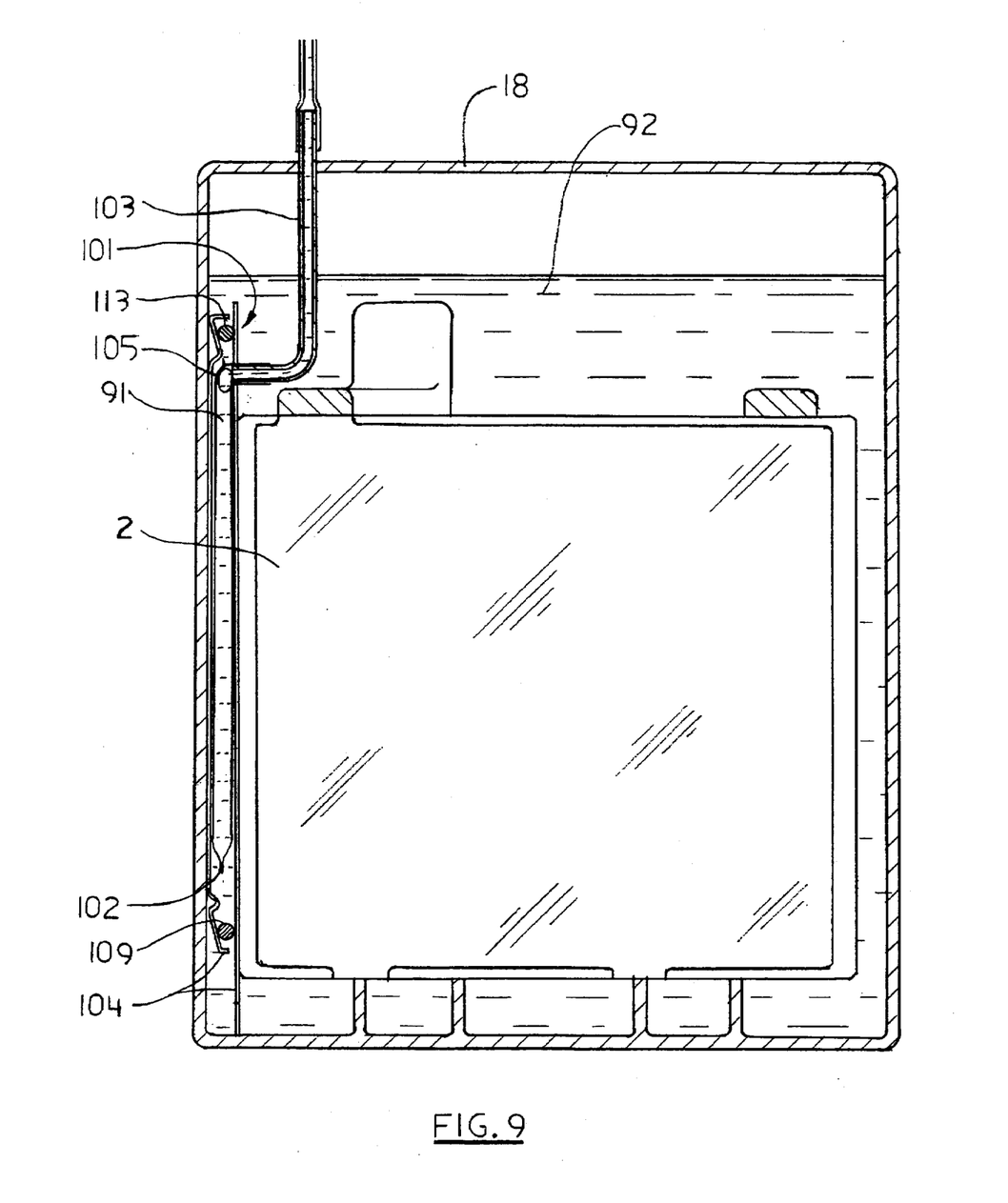
FIG. 9 is a vertical cross section through a cell pump in a third embodiment of the invention.
Figure 10:
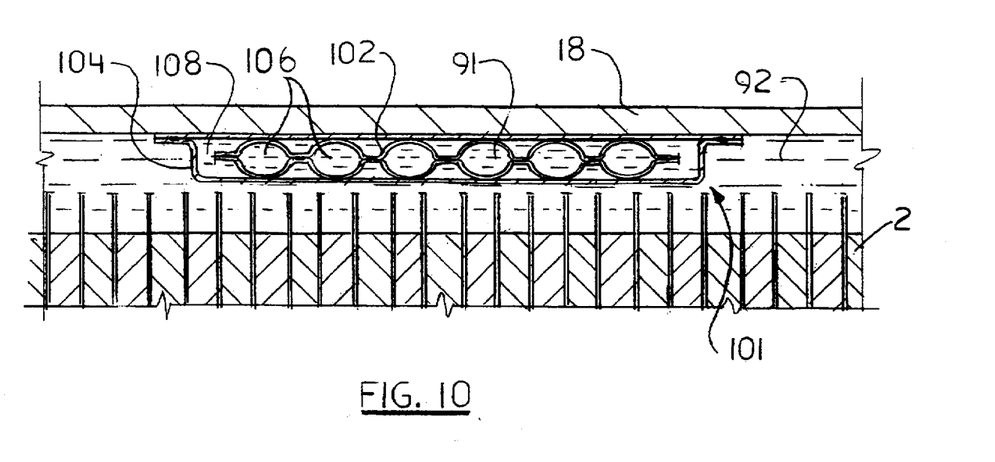
FIG. 10 is an enlarged horizontal section through the cell pump of the embodiment shown in FIG. 9.

Another embodiment of the invention is shown in elevation section in FIG. 9 and in associated horizontal cross section FIG. 10. The cell pump 101 in this embodiment is installed between the end of the plate assembly 2 and the inside of the cell enclosure 18 at the time of assembling the cell. As shown in FIG. 9, a supply/return tube 103 is sealed to bladder 102 of cell pump 101 in such a manner that it connects with manifold 105 which intersects with all of the tubular vertical passages 106 in bladder 102 that are shown in FIG. 10. Bladder 102 is constructed of a thin acid resistant plastic film such as polyethylene or polypropylene that is heat sealable. All of the fluid passages of bladder 102 shown in FIG. 10 are created by heat sealing their outlines in the two layers of plastic film from which the bladder is constructed.

Figure 11A:
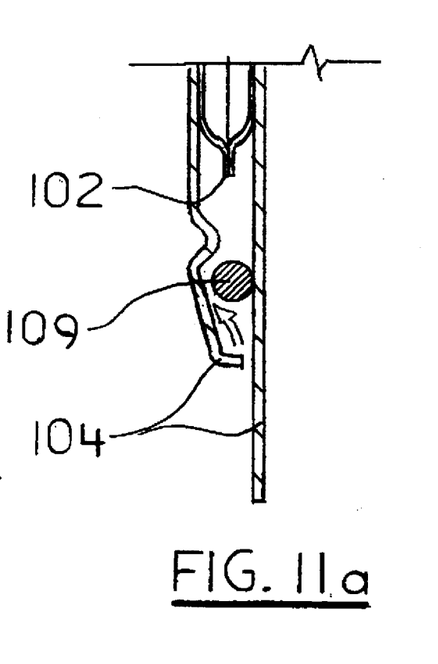
FIGS. 11a and 11b are enlarged vertical sections through the suction and discharge valves in the embodiment shown in FIG. 9.
Figure 11B:
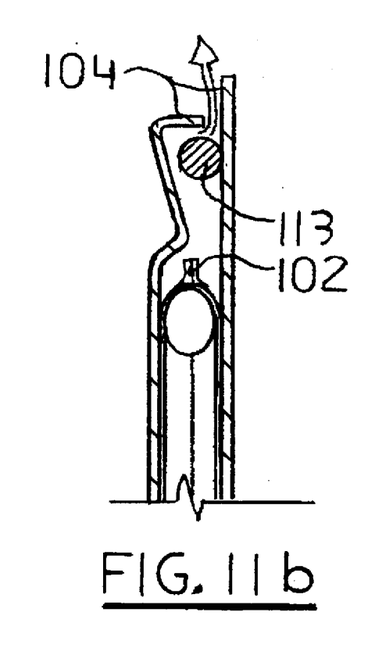

The bladder 102 is installed and sealed within jacket 104 with supply/return tube 103 projecting through an opening 107 in one wall of jacket 104. Bladder 102 is filled with actuating fluid 91 by pressure pump 33 in hydraulic power supply 3 through supply/return tube 103, and compartment 108 between the outer surfaces of bladder 102 and the inner surfaces of enclosure 104 is filled with electrolyte 92 from the bottom of the plates 2 through suction valve 109. The operation of the suction valve 109 is shown in FIGS. 11a and 11b. The volume of compartment 108 increases when bladder 102 flattens as it is being evacuated of actuating fluid 91 by suction pump 35 in hydraulic power supply 3, creating negative pressure in compartment 108. The pressure difference between compartment 108 and the surrounding electrolyte 92 causes the suction valve 109 to lift and admit electrolyte 92 to the compartment 108 as shown in FIG. 11a. Valve 109 is constructed of a short length of acid resistant elastomer rod such as nitrile or a fluoroelastomer. Conversely, when actuating fluid 91 is supplied to bladder 102 the volume of compartment 108 decreases as bladder 102 swells, creating a positive pressure in compartment 108. The pressure differential causes discharge valve 113 to lift and provide a passage for electrolyte 92 from compartment 108 to the volume of electrolyte above the plate assembly 2 as shown in FIG. 11b. The construction of discharge valve 113 is similar to that of the suction valve 109.

Figure 12:
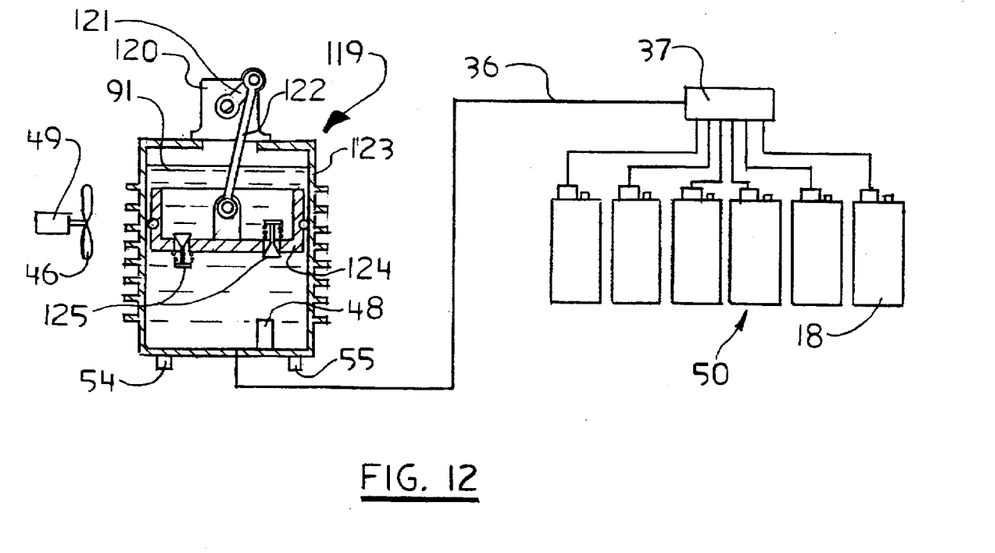
FIG. 12 is a schematic drawing of a second embodiment of the hydraulic power supply.

Another embodiment of the hydraulic power supply is shown in the schematic drawing, FIG. 12. The hydraulic power supply 119 pumps the actuating fluid 91 with a positive displacement pump that consists of a piston 124 slidably fitted inside the reservoir 123 and a gearhead motor 120 that reciprocates the piston 124 through a linkage made up of a crank arm 121 and a connecting rod 122. Two relief valves 125 are provided in the piston 124 in opposite relieving directions so that the pressure differential across the piston in either positive or negative sense is limited to the setting of the relief valves 125. The output pressure from the hydraulic power supply 119 in fluid conduit 36 is limited in this manner to the rated pressure of the bladders in the cell pumps that are actuated by the supply.

The maximum displacement of the pump is the product of the piston area and the piston stroke. The displacement is designed to exceed the sum of the displacements of the cell pumps so that the cell pumps will be completely filled and evacuated in each operating cycle. The piston 124 has not reached its full stroke when the cell pumps are completely filled or evacuated and the actuating fluid that is pumped in the remainder of the stroke flows through one or the other of the relief valves 125. This function could alternatively be accomplished by inserting a spring load in the connecting rod 122 which would compress or extend when the piston load reached the maximum allowable pressure.

A major advantage of this embodiment of the hydraulic power supply is that the pump runs continuously and thus does not require an electronic controller to operate one or the other of the two pumps that are used in the embodiment of FIG. 4.

CONCLUSION

Accordingly, the reader will see that the electrolyte conditioning system of this invention provides a means to concurrently homogenize both electrolyte concentration and electrolyte temperature throughout all cells of a battery. The device can be used to extend battery life while increasing the charge receptivity and power discharge capability. In addition, the device works while the battery is being discharged as well as while the battery is charging, can be retrofitted or installed at the time of manufacture, and has a minimum of support apparatus. The invention accomplishes its goals without the hazardous transportation of electrolyte outside of the battery cell, without the hazardous and maintenance causing gassing of the battery, and without major changes in the structure of the battery housing or plates.

While the above description contains many specificities, they should not be construed as limiting the scope of the invention, but merely as providing illustrations of some of the presently preferred embodiments of this invention. Many other variations are possible. For example, the functions of the hydraulic power supply could also be achieved with various hydraulic circuits such as more conventional hydraulic circuit that uses a single pump and a four way valve to switch between pressure and suction pumping modes, or a reciprocating cylinder pump could be used to alternately discharge actuating fluid from and then ingest actuating fluid into the cylinder pump.

The cell pumps can be made in various configurations to suit varying types and shapes of cells as well a being made of alternate acid-resistant materials through various processes. The location of the inlets and outlets of the cell pumps could be reversed without compromising the operation of the electrolyte conditioning system. The lighter, less concentrated electrolyte at the top of the cells could be pumped to the bottom of the cells to mix with the heavier and more concentrated electrolyte there in order to equally well achieve homogenization.

The bladders may be made of a variety of malleable, acid resistant materials such as polypropylene or synthetic rubber; the bladders could also be of a variety of shapes, including pyramidical and pleated, to enhance the performance during the pumping cycle; the bladders could be formed in a number of different manufacturing methods including injection molding, vacuum forming, and heat sealing.

The heat exchanger/reservoir could be of various configurations, and could interface with vehicle controls to utilize the excess heat for a variety purposes.

Accordingly, the scope of the invention should be determined not by the embodiments illustrated, but by the appended claims and their legal equivalents.

We claim:

1. An apparatus for circulating and controlling the temperature of the liquid electrolyte within cells of a battery, such apparatus comprising:

fluid actuated pumps hydraulically connected to each cell of said battery;

inlet means for admitting electrolyte from a first location in said cells into said pumps;

outlet means for discharging electrolyte from said pumps to a second location in said cells;

fluid conduit means in said pumps for admitting or removing actuating fluid from said pumps;

bladders within said pumps for separating said electrolyte and said actuating fluid while said bladders alternately cause electrolyte to be expelled through said outlet means or to be ingested through said inlet means.

2. The apparatus of claim 11 wherein heat transfer occurs between said electrolyte and said actuating fluid through said bladders.

3. The apparatus of claim 1 wherein said fluid actuated pumps are installed in each cell of said battery within the cell enclosures.

4. The apparatus of claim 1 wherein said fluid actuated pumps are installed in each cell of said battery through an opening in the cell enclosures.

5. The apparatus of claim 1 wherein said bladders are comprised of a membrane of chemically resistant elastomer.

6. The apparatus of claim 1 wherein said bladders are comprised of a membrane of chemically resistant plastic.

7. An apparatus for circulating and controlling the temperature of the liquid electrolyte within cells of a battery, such apparatus comprising:

fluid actuated pumps installed in each cell of said battery;

inlet means for admitting electrolyte from a first location in said cells into said pumps;

outlet means for discharging electrolyte from said pumps to a second location in said cells;

valve means within said pumps for directing electrolyte flow from said inlet means to said outlet means;

fluid conduit means in said pumps for admitting or removing actuating fluid from said pumps;

bladders within said pumps for separating said electrolyte and said actuating fluid while said bladders alternately cause electrolyte to be expelled through said outlet means or to be ingested through said inlet means.

8. The apparatus of claim 7 wherein heat transfer occurs between said electrolyte and said actuating fluid through said bladders.

9. The apparatus of claim 7 wherein said bladders are comprised of a membrane of chemically resistant elastomer.

10. The apparatus of claim 7 wherein said bladders are comprised of a membrane of chemically resistant plastic.

11. The apparatus of claim 7 wherein said valve means are comprised of chemically resistant elastomer disks.

12. The apparatus of claim 7 wherein said valve means are comprised of chemically resistant balls.

13. The apparatus of claim 1 wherein said actuating fluid is supplied by a hydraulic power supply, said hydraulic power supply comprising:

a fluid reservoir;

pump means, one connection to which is from said fluid reservoir and the other connection to which is from a fluid conduit means to said cell pumps;

control means for said pump means that alternately supplies positive and negative pressure to said fluid conduit to said cell pumps for timed periods whenever electric current is flowing into or out of said battery.

14. The apparatus of claim 13 wherein the outer surface of said fluid reservoir is shaped to provide additional surface area for transferring heat from said actuating fluid through said reservoir to the air surrounding said reservoir.

15. The apparatus of claim 13 wherein the air surrounding said reservoir is caused to flow around said reservoir by an electric motor driven fan in response to a temperature sensor.

16. The apparatus of claim 13 wherein an electric heater is provided on said reservoir that is energized in response to a temperature sensor.

17. The apparatus of claim 7 wherein said actuating fluid is supplied by a hydraulic power supply, said hydraulic power supply comprising:

a fluid reservoir;

pump means, one connection to which is from said fluid reservoir and the other connection to which is from a fluid conduit means to said cell pumps;

control means for said pump means that alternately supplies positive and negative pressure to said fluid conduit to said cell pumps for timed periods whenever electric current is flowing into or out of said battery.

18. The apparatus of claim 17 wherein the outer surface of said fluid reservoir is shaped to provide additional surface area for transferring heat from said actuating fluid through said reservoir to the air surrounding said reservoir.

19. The apparatus of claim 17 wherein the air surrounding said reservoir is caused to flow around said reservoir by an electric motor driven fan in response to a temperature sensor.

20. The apparatus of claim 17 wherein an electric heater is provided on said reservoir that is energized in response to a temperature sensor.

* * * * *